US011487671B2

(12) United States Patent
Zhang et al.

(10) Patent No.: US 11,487,671 B2
(45) Date of Patent: Nov. 1, 2022

(54) GPU CACHE MANAGEMENT BASED ON LOCALITY TYPE DETECTION

(71) Applicant: ADVANCED MICRO DEVICES, INC., Santa Clara, CA (US)

(72) Inventors: Xianwei Zhang, Austin, TX (US); John Kalamatianos, Boxborough, MA (US); Bradford Beckmann, Bellevue, WA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 186 days.

(21) Appl. No.: 16/446,119

(22) Filed: Jun. 19, 2019

(65) Prior Publication Data

US 2020/0401529 A1 Dec. 24, 2020

(51) Int. Cl.
*G06F 12/0891* (2016.01)
*G06F 12/0888* (2016.01)
*G06F 12/0895* (2016.01)
*G06F 9/54* (2006.01)
*G06F 9/38* (2018.01)

(52) U.S. Cl.
CPC ........ *G06F 12/0891* (2013.01); *G06F 9/3877* (2013.01); *G06F 9/545* (2013.01); *G06F 12/0888* (2013.01); *G06F 12/0895* (2013.01); *G06F 2212/1021* (2013.01)

(58) Field of Classification Search
CPC ............. G06F 12/0891; G06F 12/0888; G06F 12/0895; G06F 9/3877; G06F 9/545
USPC ............................ 711/144, 137, 12.004, 118
See application file for complete search history.

(56) References Cited

U.S. PATENT DOCUMENTS

| 9,477,526 | B2* | 10/2016 | Johnson | G06F 9/5016 |
| 9,898,409 | B2* | 2/2018 | Sethia | G06F 8/45 |
| 10,725,923 | B1* | 7/2020 | Ma | G06F 12/0833 |
| 2014/0130055 | A1* | 5/2014 | Guha | G06F 9/5011 |
| | | | | 718/104 |
| 2014/0173193 | A1* | 6/2014 | Fahs | G06F 12/1027 |
| | | | | 711/108 |

(Continued)

OTHER PUBLICATIONS

Chen, Xuhao et al., "Adaptive Cache Management For Energy-Efficient GPU Computing", 47th Annual IEEE/ACM International Symposium on Microarchitecture (MICRO), 2014, 13 pages.

(Continued)

*Primary Examiner* — Yaima Rigol
*Assistant Examiner* — Edward Waddy, Jr.

(57) ABSTRACT

Wavefront loading in a processor is managed and includes monitoring a selected wavefront of a set of wavefronts. Reuse of memory access requests for the selected wavefront is counted. A cache hit rate in one or more caches of the processor is determined based on the counted reuse. Based on the cache hit rate, subsequent memory requests of other wavefronts of the set of wavefronts are modified by including a type of reuse of cache lines in requests to the caches. In the caches, storage of data in the caches is based on the type of reuse indicated by the subsequent memory access requests. Reused cache lines are protected by preventing cache line contents from being replaced by another cache line for a duration of processing the set of wavefronts. Caches are bypassed when streaming access requests are made.

20 Claims, 4 Drawing Sheets

(56) References Cited

U.S. PATENT DOCUMENTS

| | | | |
|---|---|---|---|
| 2016/0103715 A1* | 4/2016 | Sethia | G06F 9/5083 |
| | | | 718/106 |
| 2017/0060588 A1* | 3/2017 | Choi | G06F 15/80 |
| 2017/0139751 A1* | 5/2017 | Chen | G06F 9/5016 |

OTHER PUBLICATIONS

Tian, Yingying et al., "Adaptive GPU Cache Bypassing", 8th Workshop on General Purpose Processing using GPUs (GPGPU 8), Feb. 2, 2015, 11 pages.

Koo, Gunjae et al., "Access Pattern-Aware Cache Management For Improving Data Utilization In GPU", 44th International Symposium on Computer Architecture (ISCA), Jun. 2017, 13 pages.

Xie, Xiaolong et al., "An Efficient Compiler Framework For Cache Bypassing On GPUs", The International Conference an Computer-Aided Design (ICCAD), 2013, 8 pages.

Bloom, Burton H. "Space/Time Trade-Offs In Hash Coding With Allowable Errors", Communications of the ACM, vol. 13, No. 7, Jul. 1970, 5 pages.

Li, Dong et al., "Priority-Based Cache Allocation In Throughput Processors", The 21st International Symposium on High Performance Computer Architecture (HPCA), 2015, 12 pages.

* cited by examiner

GPU CACHE MANAGEMENT BASED ON LOCALITY TYPE DETECTION

GOVERNMENT LICENSE RIGHTS

This invention was made with government support under Prime Contract Number DE-AC52-07NA27344, Subcontract Number B620717, awarded by the U.S. Department of Energy (DOE). The U.S. Government has certain rights in this invention.

BACKGROUND

A modern graphics processing unit (GPU) includes memory caches for storing data. These caches have limited capacity and, in operation, are subject to concurrent access by a large number of threads, resulting in frequent cache misses and relatively low memory access efficiency. In addition, conventional memory management techniques, which apply uniform management criteria to all requests, are not well-suited for memory traffic generated by GPU compute applications, which exhibit highly varying behavior. Further, conventional approaches to memory management can allocate data to different caches inefficiently, such as by storing one-time-use data in multiple caches at different levels of a memory hierarchy, thereby wasting system resources.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

FIGS. 1-4 illustrate techniques for managing data stored at caches of a processing unit having a plurality of parallel processing units based on temporal locality (i.e., frequency of use over a period of time) and data reuse of memory traffic at the processing unit. One or more wavefronts (WFs) of a set of WFs executing at the processing unit are selected for monitoring and characterization of the behavior of all WFs of the set of WFs. For example, the WF first scheduled for execution in the processing unit is selected for monitoring and the behavior of this WF is characterized therefrom. The characterization is used to shape the execution pattern of memory access requests for the remaining WFs of the set of WFs.

For the selected WF, the processing unit identifies the temporal locality of each memory access instruction of a specified type (e.g., each vector load instruction) based on the number of times that data targeted by the instructions of the selected WF are accessed at a cache of the processing unit. Each memory access instruction is assigned an access type based on its corresponding temporal locality. For example, memory accesses having a low temporal locality are identified as a streaming type of memory access. For the streaming type, the processing unit does not store data in one or more caches for subsequent WFs of the set of WFs, thereby bypassing these caches and improving cache use and overall memory access efficiency for the processing unit. Bypassing the caches reduces the likelihood that data associated with higher temporal locality memory accesses are early evicted from the caches.

In another example, a set of WFs exhibit a significant amount of temporal locality with a relatively high amount of data reuse. In this example, the data in one or more caches that are targeted by memory access requests are likely to be repeatedly accessed as the WFs of the set of WFs are executed. For a set of WFs that exhibits a mix of low and high temporal locality, based on the monitoring of a WF in the set, one or more additional steps are taken to improve cache management including providing cache protection for certain reoccurring memory access requests and certain potential victim cache entries. In contrast to using the structures and techniques described herein, conventional GPU memory management techniques manage data in the caches without regard for temporal locality, resulting in early eviction for data exhibiting high temporal locality. Thus, higher cache miss rates occur when certain data are re-accessed.

Figure 1:
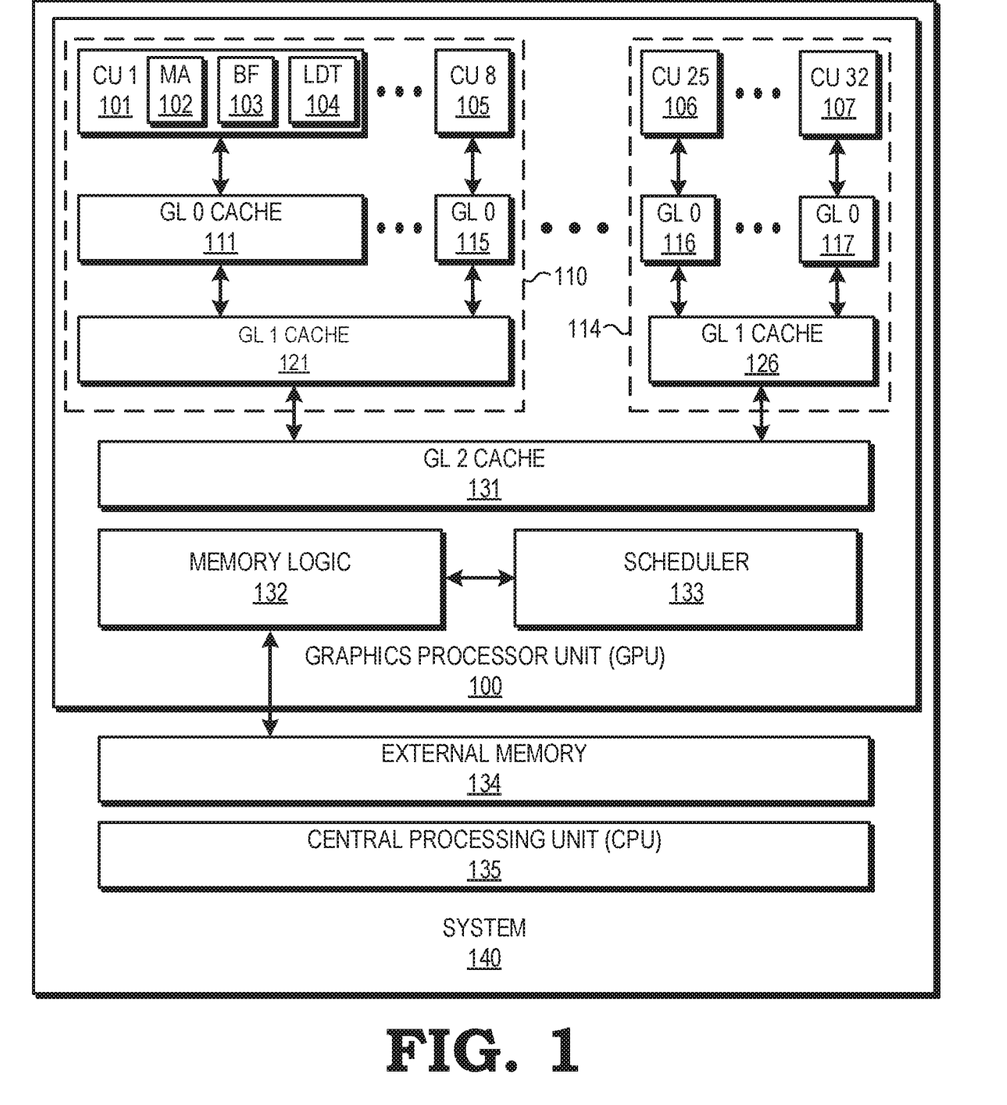
FIG. 1 is a block diagram of a graphics processor unit (GPU) having locality type structures for distinguishing temporal locality and data reuse patterns in memory caches of the GPU in accordance with some embodiments.

FIG. 1 is a block diagram of a GPU 100 as an example of a processing unit having locality type structures for distinguishing temporal locality and data reuse patterns in memory caches of the GPU in accordance with some embodiments. The GPU 100 is part of a system 140 having a central processing unit (CPU) 135 and an external memory 134 outside of the GPU 100. The GPU 100 includes a plurality of compute units (CUs) organized into groups 110 of eight CUs each. The groups 110 are also referred to as shader-arrays. For example, a first CU 101 labeled as "CU 1" through an eighth CU 105 labeled as "CU 8" are in a first group 110. A 25th through 32nd CU labeled as "CU 25" and "CU 32", respectively, are grouped into a fourth group 114 with a second group and a third group of CUs not illustrated in the GPU 100 for sake of convenience. The GPU 100 thereby has at least one complex of 32 CUs numbered 1-32 divided equally among four groups. The CUs are also referred to as parallel processing compute units.

Each CU has its own private first level cache for storing data therein in the form of cache lines. For example, the first CU 101 has associated therewith its own private first level cache 111 labeled "GL 0" where the "G" refers to graphics and GPU to distinguish the first level cache 111 from a CPU cache or other first level (L1 or L0) cache in the system 140. The eighth CU 105 has its own private first level cache 115 labeled "GL 0." The fourth group 114 illustrates two other first level caches 116, 117 associated with the 25th CU 106 and 32nd CU 107, respectively, where each first level cache of the fourth group 114 is also labeled "GL 0." Each private first level cache is coupled to a first level shared cache. For example, each private first level cache 111, 115 of the first group 110 is coupled to a first level shared cache 121 labeled as "GL 1" that is shared among active WFs that are operative on the first group 110 of CUs 101, 105. The fourth group 114 includes a fourth first level shared cache 126 labeled "GL 1." All first level shared caches 121, 126 are then coupled to a GPU-shared cache 131 labeled as "GL 2" that is shared by all CUs 101, 105, 106, 107 in a complex of groups of CUs (e.g., a set of four groups represented by the first and fourth groups 110, 114 of CUs). In summary, the three types of GPU caches are indexed from 0 to 2 in FIG. 1.

The GPU 100 of the system 140 also includes a memory logic 132 and a scheduler 133. The memory logic 132 manages memory signals sent between certain memories in the system 140 such as between the GPU-shared cache 131 and the external memory 134. The scheduler 133 supports processing of workloads in the GPU 100 as part of a GPU pipeline. The GPU pipeline executes WFs at the CUs 101, 105, 106, 107. For sake of simplicity, each of the CUs 101, 105, 106, 107 also include additional modules and structures not specifically illustrated in FIG. 1, such as fetch and decode logic to fetch and decode instructions on behalf of the CU, one or more register files to store data for executing instructions, and the like so that the CUs 101, 105, 106, 107 execute instructions in a pipelined fashion for the GPU 100.

In the GPU 100, the scheduler 133 receives requests from the CPU 135 to execute threads at the compute units. The scheduler 133 schedules the threads for execution in one or more basic units of scheduling, referred to herein as a wavefront (WF), as part of the graphics pipeline. The scheduler 133 buffers each received request until one or more of the parallel processing units (i.e., the CUs 101, 105, 106, 107) are available to execute a new WF. When a CU is available, the scheduler initiates execution of the threads in the new WF by, for example, providing an address of an initial instruction of a new thread in the new WF and an identifier of the WF to a fetch stage of the available CU.

In the course of executing the instructions of a WF, the CUs generate memory access requests. The memory logic 132 satisfies the memory access request by traversing the memory hierarchy formed by the caches corresponding to the CU that generated the request. The memory logic 132 begins with the first level cache corresponding to the designated CU and checks each successive cache in the memory hierarchy (ending with the memory 134) until it locates the data targeted by the memory access request. In addition, based on the cache management scheme implemented by the GPU 100, the memory logic 132 can transfer the targeted data to a different level, or levels, of the memory hierarchy.

As described further herein in relation to FIGS. 1-4, the GPU 100 generally implements a cache management scheme based at least in part on the temporal locality of memory access requests. To support these cache management techniques, each CU, such as the first CU 101, includes three structures for locality type detection and monitoring: a monitor array 102 labeled "MA," a Bloom filter array 103 labeled "BF," and a locality detection table 104 labeled "LDT." Generally, the MA 102 and the BF 103 are used together as a unit for detecting whether a memory access request is repeated to the CU 101, and the LDT 104 is used to track an amount of reuse for the instructions associated with those request entries persisted in either the MA 102 or BF 103.

The MA 102 stores tags for determining whether a particular memory access has been requested before such as by the particular WF under evaluation. When a memory access request is executed by the CU 101, the MA 102 is searched. This searching is performed when memory access requests are issued inside of a monitoring window. The monitoring window is a time period during which at least one CU is operative in the GPU 100 and is monitoring memory access requests of one or more WFs of a set of WFs. This searching is conducted before any cache 111, 121, 131 is accessed. In some embodiments, the MA 102 is direct-mapped with one or more of the caches 111, 121, 131. The MA 102 holds only part of the memory access request's target address as a tag in each MA entry. The MA 102 estimates the temporal reuse of addresses by providing an indication of whether the address has been visited before.

The BF 103 is provided as an overflow for entries that are evicted from the MA 102, the entries in the BF 103 becoming overflow entries of the MA 102 when a number of entries created for monitoring purposes exceeds the number of available entries in the MA 102. The BF 103 is an example of a space-efficient probabilistic data structure to test whether an element is a member of a set of entries such as the memory access requests provided to the CU 101. The BF 103 is used instead of merely using an equivalently larger MA 102. That is, the use of a reasonably sized MA 102 and a reasonably sized BF 103 provides a good balance of performance to size compared to just use of the MA 102. Entries can be added to the set of entries in the BF 103 but are generally not removed.

In general, for BFs, the more elements that are added to the set, the larger the probability of false positives due to inherent inefficiencies of hashing algorithms used in the BF. The BF 103 is used for applications where an amount of source data would require an impractically large amount of memory if error-free hashing techniques were applied. With sufficient core memory, an error-free hash could be used but is not an option as there are many CUs in a typical GPU like the GPU 100 described herein. The BF 103 uses a smaller hash area and still identifies most memory cache accesses. Fewer than 10 bits per element (entry in the BF) are usually required for a 1% false positive probability. The use of the BF 103 provides a balance both to space overhead and a false positive rate in the CUs of the GPU 100. Embodiments of CUs other than the CUs 101, 105, 106, 107 have only a BF 103 or only a monitor array 102. During GPU 100 operation, cache entry searches are conducted in both the MA 102 and the BF 103 either concurrently or sequentially and thereby temporal reuse is tracked by both structures.

When a hit is found in either the MA 102 or the BF 103, by matching a part of a memory access request to a tag in the MA 102 or the BF 103, the LDT 104 creates an entry, indexed by the instruction ID (i.e., Program Counter), if an entry does not yet exist matching the instruction ID, and the LDT 104 updates a reuse counter for the corresponding entry found in the MA 102/BF 103. A return from a lookup in the MA 102 and the BF 103 is either a "hit" or a "miss" signal. Based on this signal, an instruction entry in the LDT 104 is updated. This process is repeated in the first CU 101 for cache access requests from a WF that is being monitored for reuse in the first CU 101. This monitoring process is repeated across CUs 101, 105 for the monitored WF that is being loaded and processed by the first group 110 of CUs until the monitored WF is completed or until the cache monitoring by the MA 102, BF 103, and the LDT 104 is completed for the monitored WF as further described herein.

Figure 2:
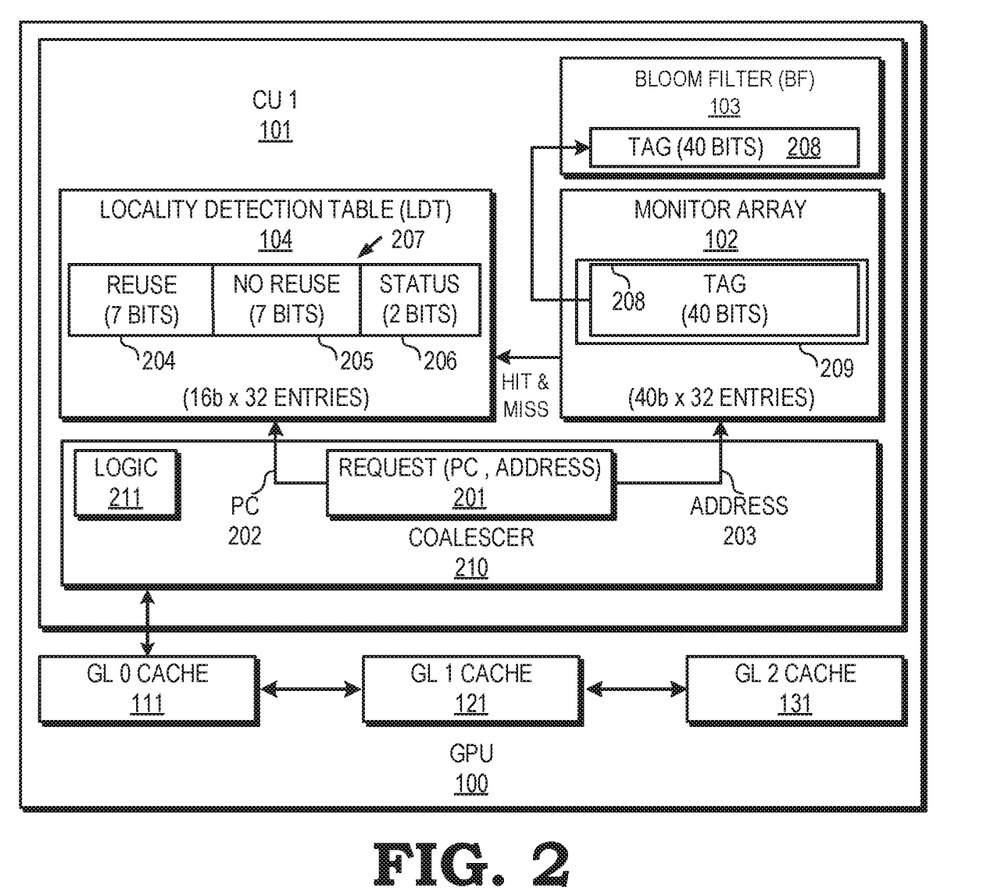
FIG. 2 is a block diagram of locality detection and reuse structures of compute units (CUs) of FIG. 1 in accordance with some embodiments.

FIG. 2 is a block diagram of locality detection and reuse structures of the CUs 101, 105, 106, 107 of FIG. 1 in accordance with some embodiments. Each of the CUs in the GPU 100, such as the first CU 101, includes the monitor array 102 labeled "MA," the Bloom filter array 103 labeled "BF," and the locality detection table 104 labeled "LDT." In addition, each CU includes a coalescer 210. The coalescer 210 includes memory cache access logic 211 (labeled as "logic") to coalesce or consolidate memory cache access requests 201 labeled as a "request." Each request 201 includes an instruction program counter (PC) 202 and a request target address 203 labeled "address." The LDT 104 includes a number of LDT entries 207, where each LDT entry 207 includes one or more of a reuse field 204, a no-reuse field 205, and a status field 206. The MA 102 includes a structure to hold a set of entries 209, each entry including a tag 208. The BF 103 includes a set of BF entries, each BF entry including a tag 208. The numbers of bits used for the fields 204, 205, 206, and tag 208 shown in FIG. 2 are exemplary. In other implementations, different numbers of bits for these and other elements may be used.

In the GPU 100, by analyzing memory accesses of a GPU application (not illustrated), during GPU kernel execution, a vector load instruction typically has relatively stable access behavior across a set of WFs. Threads originating from one GPU kernel tend to share and execute a same program code but operate on different data such as according to the single instruction, multiple data (SIMD) execution model. Cache reference behavior of the vector load is determined from analysis of one or more selected WFs of a set of WFs. For example, the behavior of the vector load of a first WF is determined and applied to other WFs such as any of the other WFs of the set of WFs. By analyzing one or more of the WFs of the set of WFs for a particular application, streaming loads are detected and other WFs in the set of WFs are accordingly directed to bypass one, two, or all three of the caches 111, 121, 131 when the first CU 101 is scheduled by the scheduler 133 to execute such loads. To benefit from cache bypassing as described herein, a streaming vector load should (1) share few cache lines with other vector loads, and (2) rarely reuse its own data. According to some embodiments, reuse of data is considered within a single WF, and, according to other embodiments, reuse of data is considered across WFs of a set of WFs and monitoring of two or more of the WFs would then be necessary to track reuse across multiple WFs in a set of WFs.

During a part of its operation, the first CU 101 of the GPU 100 is in a monitoring phase wherein a selected WF is loaded into and is monitored at the first CU 101 for a reuse pattern to identify behavior with respect to cached data. The identified behavior is evaluated for one or more WFs selected from the set of WFs. The identified behavior is used when subsequently processing (without monitoring) at least some of the other WFs of the set of WFs and preferably when processing the remaining WFs of the set of WFs. During monitoring, the MA 102, the BF 103, and the LDT 104, and any other structures supporting operation of the same, are powered up. When not in use, such as when the first CU 101 is not monitoring reuse of cached data, one or more of these structures 102, 103, 104 are powered down to conserve power in the GPU 100.

The MA 102 and the BF 103 capture data indicative of cached data reuse behavior of vector loads of one or more selected WFs (illustrated in FIG. 3) executed at the CU 101. Based on the data reuse behavior, for example, for the first CU 101, the captured behavior triggers one or more of the first level cache 111, the first level shared cache 121, and the GPU-shared cache 131 to bypass or protect certain cache lines therein. The bypassing and protecting are performed for WFs in the set of WFs scheduled for execution in the GPU 100 by the CPU 135. In some embodiments, the first level cache 111, the first level shared cache 121, and the GPU-shared cache 131 bypass or protect certain cache lines as further explained herein with reference to FIG. 3. The MA 102 and the BF 103 are used to identify whether or not a request 201 previously has been accessed from the caches 111, 121, 131. According to some embodiments, this determination includes hashing the PC 202 and the request target address 203 of the memory access request 201 ("request") and searching for a match in the MA 102 and the BF 103. The PC 202 is a byte address pointing to a next instruction to execute. Generally, when a WF is created, the PC 202 is initialized to a first instruction in the program being executed by the system 140.

In the particular illustrated embodiment, the MA 102 includes 32 entries 209 with each MA entry 209 including a 40 bit tag 208 to store an identifier for and derived from the request 201. The BF 103 is 4,096 bits in size. To mitigate frequent MA 102 evictions, the BF 103 is set to be 4,096 1-bit entries indexed with and for the MA 102 by one or more hash functions. One bit entries are sufficient to indicate either a hit or miss when looking up entries in BF 103 when monitoring for cached data reuse. To provide a low false positive rate during use of the BF 103, a number of unique insertions is maximized to be 512 entries in the BF 103 whereby monitoring of a WF is terminated early if reaching this number of insertions during a current monitoring window. According to certain embodiments, and based on theoretical calculations, a false positive rate was determined to be approximately 2.2% for a BF sized with 512 entries. The LDT 104 includes 32 entries of 16 bits each. Each LDT entry 207 includes seven bits for a reuse field 204 as a counter, seven bits for a no-reuse field 205 as a counter, and two bits for a status field 206. Seven bits for the fields 204, 205 are by way of example, and conform to thresholds as further explained in reference to FIG. 4. In this particular embodiment, seven bits for the fields 204, 205 are sufficient to distinguish and categorize data reuse behavior of a set of WFs from monitoring of one or more WFs.

In operation, the coalescer 210 of the first CU 101 consolidates memory cache requests made by the CU 101 to the caches 111, 121, 131. That is, a memory cache request that is duplicated by another thread of execution within the monitored WF is coalesced into a single memory cache request to conserve on cache traffic. Lookups to the MA 102 and BF 103 are performed after operation of coalescer logic 211 programmed or wired in the coalescer 210. The MA 102 and the BF 103 are subject to look up by coalesced requests 201. Each request 201 includes the PC 202 and the address 203. The coalesced requests 201 are issued inside the WF monitoring window and before one or more of the respective caches 111, 121, 131 are accessed. In the WF monitoring window, at least one scheduled WF of a series of WFs is analyzed to determine whether each of the WFs in a series or set of WFs is likely to exhibit streaming behavior. Monitoring two or more WFs can lead to excessive power consumption without substantive improvement to identifying streaming, average, and high memory cache reuse—three types of reuse. Other types and groupings of reuse are possible.

In some embodiments, the MA 102 is direct-mapped and the MA 102 holds only a part of an instruction's target address in a respective tag 208 of an entry 209. The MA 102 estimates a temporal reuse of addresses by providing an indication of whether the address has been visited recently before or not. For example, a return from a lookup is either a "hit" or a "miss" signal. Based on this signal, the LDT 104 is updated. That is, one or more of the reuse and no-reuse fields 204, 205 and the status field 206 are updated. Since the MA 102 has a finite capacity, the BF 103 continues tracking temporal reuse of addresses that have been evicted from the MA 102. Each evicted (partial) address is inserted into the BF 103, and, in operation, the BF 103 is looked up simultaneously with the MA 102 to determine whether the request is reused or not by the CU 101. In other embodiments, the BF 103 can be searched sequentially after the MA 102 is searched.

The LDT 104 records reuse information using reuse and no-reuse fields 204, 205 for each entry 207. These fields 204, 205 are sized to accommodate reasonable reuse and no-reuse counts, respectively, when loading WFs. The LDT 104 is indexed using a hash of the PC 202 corresponding to a vector load of a respective analyzed WF. Each LDT entry 207 records a reuse count in the reuse field 204 and records a no-reuse count in the no-reuse field 205 for an individual vector load instruction.

In some embodiments, aliasing happens when two or more vector loads update the same LDT entry 207. For virtually tagged caches, the PC 202 of each request 201 is extended to include virtual machine identifiers (VMIDs) to distinguish different applications contemporaneously operative in the GPU 100 in a particular time window for respective virtual machines (VMs). For the same application, the recorded information in the LDT 104 is shared across WFs from a same kernel, which is also referred to herein as a GPU kernel to distinguish from an operating system or host kernel. The CPU 135 provides the GPU kernel for the group 110 of compute units to execute. Depending on the configuration of the system 140, including a state and functions of a program operative on the host system 140 (e.g., operative on the CPU 135) of the GPU 100, the GPU kernel is launched by the CPU 135 and is then operative in the CU 101, or operative across multiple CU's of the GPU 100, and such memory loading requests of wavefronts of the GPU kernel are altered as further described herein. With respect to the status field 206, with the use of two bits, there are four possible states.

Tracking of temporal locality types corresponds to three states with a first state value of 0,1; a second state value of 1,0; and a third state value of 1,1 where a fourth state value of 0,0 is not used. The three used states correspond to: "streaming," "normal," and "reused," respectively. In the event that one of the statuses is not determined upon reaching an end of analysis of a WF, an additional 16*b* sized field stores an identifier of the monitored WF. This identifier field is checked by the CU 101 upon completion of monitoring the selected WF to decide whether monitoring is completed. In the LDT 104, one of the three states is identified for a set of WFs when a respective cache use threshold is crossed. For example, when a reuse value in the reuse field 204 exceeds a reuse threshold value for the WF under evaluation (monitoring), a status of "reused" is identified for the monitored instructions as well as for the set of WFs to which the monitored WF belongs. A similar mechanism and respective threshold are operative for each of the "normal" and "reused" statuses. While not illustrated, each LDT entry 207 optionally includes a 1-bit sized field denoting a monitor status where a status value of 0 indicates that monitoring of a particular WF is ongoing, and a status value of 1 indicates that monitoring of the particular WF is complete. The MA 102, the BF 103, and the LDT 104 are used in conjunction with one another to monitor and identify an access type for the set of WFs.

Figure 3:
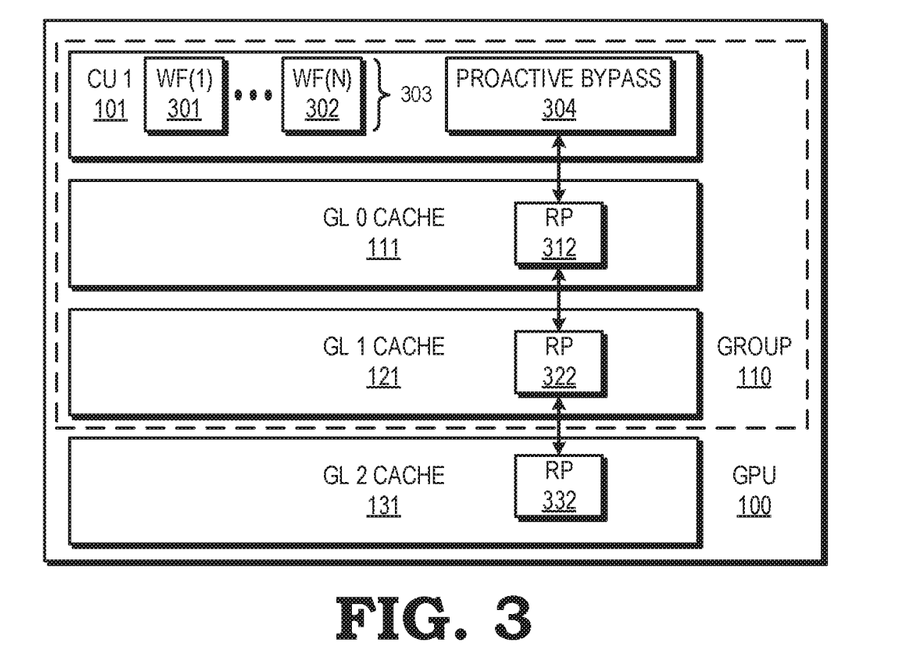
FIG. 3 is a block diagram of additional data bypass and data protection structures of the caches of the GPU of FIG. 1 in accordance with some embodiments.

FIG. 3 is a block diagram of additional data bypass and data protection structures of the caches of the GPU of FIG. 1 in accordance with some embodiments. The structures are in addition to those illustrated in FIG. 1 and FIG. 2. Each of the CUs such as the first CU 101 includes a proactive bypass ("PB") structure 304. Each of the caches 111, 121, 131 includes a replacement protection ("RP") structure. The first level cache 111 labeled as "GL 0" includes a first replacement protection structure 312 labeled "RP". The first level shared cache 121 labeled as "GL 1" includes a second replacement protection structure 322 labeled "RP". The GPU-shared cache 131 labeled as "GL 2" includes a third replacement protection structure 332 labeled "RP". A set of WFs 303 is operative to be received and processed by the first CU 101 of the first group 110 of CUs. The set of WFs 303 includes a first WF 301 labeled "WF(1)" through an Nth WF 302 labeled "WF(N)." The proactive bypass structure 304 and the RPs 312, 322, 332 are each described in further detail below.

According to some embodiments, the GPU 100 monitors the first WF 301 when the WF 301 is dispatched and the GPU 100 tracks all accesses during the first WF 301 execution. This step is also referred to as training. The monitoring is initiated upon each unique GPU kernel launch as determined from the request 201 as explained above. The monitoring ends upon completion of execution of the first dispatched WF of the GPU kernel. As illustrated in FIG. 3, the proactive bypass structure 304 resides in the first CU 101, and is activated by identifying a predominately streaming set of WFs. Subsequent cache requests are subject to lookup in the LDT 104, and to a new or updated cache policy, requiring no change to data in cache structures for a set of WFs 303 exhibiting predominantly streaming behavior.

Figure 4:
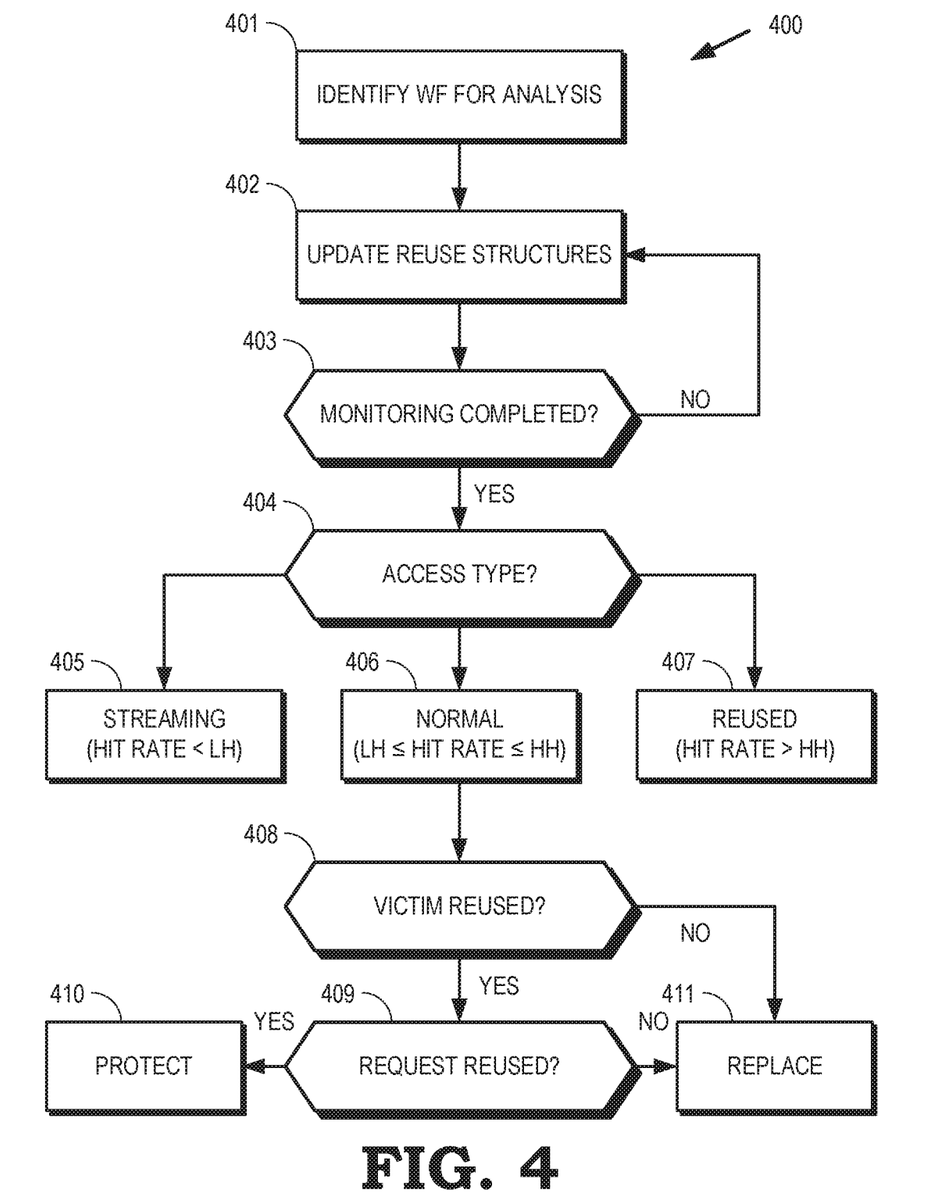
FIG. 4 is a flow diagram illustrating a method for locality type detection for wavefront loading of processors in accordance with some embodiments.

FIG. 4 is a flow diagram illustrating a method 400 for locality type detection for wavefront loading of processors in accordance with some embodiments. At block 401, one or more WFs are identified for monitoring during execution by a GPU. For example, the first WF 301 to be scheduled for execution is selected for monitoring and the first WF 301 is indicative of behavior of all WFs in the set of WFs 303 where each WF of the set of WFs 303 is or will be scheduled for execution at one or more CUs in the GPU at the time the first WF 301 is scheduled for execution. At block 402, one or more reuse structures are updated. For example, reuse and no-reuse fields 204, 205 are updated during monitoring of execution of the first WF 301. At block 403, it is determined whether the monitoring of the identified WF is completed. If not, the method 400 returns to block 402 and the first WF 301 is further monitored. If monitoring is completed, at block 404, what instruction access type is associated with the one or more WFs that were monitored is determined. In some embodiments, monitoring is completed when a minimum number of memory cache hits is reached, or when a particular hit rate ratio is reached or exceeded (e.g., a high hit-rate threshold value). In other embodiments, monitoring is completed when the entire WF that was previously selected for monitoring is vector loaded into the GPU 100.

At block 405, a streaming access type is indicated for the set of WFs 303 by observing that a measured cache hit rate ratio (as one measure of "hit rate") is less than a low hit-rate ("LH") threshold value. According to some embodiments, the reuse ratio is the number of reuses divided by a sum of the reuses and no-reuses such as the value of the reuse field 204 divided by the sum of the reuse field 204 and the no-reuse field 205. At block 407, a reused access type is indicated for the set of WFs 303 by observing that the measured hit rate ratio is greater than a high hit-rate ("HH") threshold value. And, at block 406, a normal access type is indicated for the set of WFs 303 by observing that the measured hit rate ratio is greater than or equal to the LH threshold value and less than or equal to the HH threshold value. In some embodiments, the LH and HH threshold values are predetermined values. Based on the cache hit rate, the method 400 includes managing storage of data at one or more caches, such as one or more of the caches 111, 121, 131 of the GPU 100, based on the reused access type of cache lines indicated by or in subsequent memory cache requests. For example, management performing replacement protection by setting a bit in, or issuing a command to, one or more of the replacement protection structures 312, 322, 332 in one or more of the respective caches 111, 121, 131.

If true at block 406, further evaluation as part of the method 400 is performed for the instruction exhibiting some ("normal") reuse greater than streaming and less than relatively high reuse. At block 408, the method 400 includes determining whether the victim cache line entry is issued by a "reused" instruction. If not, at block 411, the cache line entry is replaced. At block 408, if the victim cache line entry is issued by a reused instruction, a further inquiry is made. At block 409, the method 400 includes determining whether the request is reused. If not, at block 411, the cache line entry is replaced in the respective cache 111, 121, 131. Otherwise, if so, at block 410, one or more protections are implemented such as performing replacement protection in one or more of the caches 111, 121, 131, or making an entry in the monitor array 102 or the Bloom filter 103, or a combination of the same.

In operation, the method 400 leads to actions taken when sending subsequent load requests to the caches 111, 121, 131. For example, each CU such as the first CU 101 through the eighth CU 105 of the first group 110 of CUs consult their respective LDTs to retrieve the locality type of the instruction. In response to determining that the locality type is streaming (status: 0,1), subsequent requests to the cache 111, 121, 131 are modified or tagged with a type bit that dictates to one or more cache controllers to bypass (not install) data on the response path to any of the caches 111, 121, 131. For requests determined to have normal reuse (status: 1,0) at block 406 and high temporal reuse (status: 1,1) at block 407, an extra bit (reuse bit) is added to the type bit of subsequent requests to indicate that these requests are expected to have high temporal locality. This second bit marks the cache line of the caches 111, 121, 131 as highly reused, and this bit is used by the cache replacement policy to assign higher priority to these requests. As such, highly reused (memory) blocks are prevented from being replaced by other cache lines that have low reuse for a duration of processing a series or set of WFs associated with a computer program or application operative in the GPU 100 when space in the cache is available.

In the method 400, at least one WF is evaluated for the set of WFs. The particular WF is either the first WF dispatched to the GPU from the set of WFs, or a pre-selected WF such as the first, a second, or a third WF dispatched to a particular group of CUs or to a particular CU of a group of CUs such as a first-in-time WF dispatched to a second CU in the group of CUs for loading and execution. If a selected WF is subject to monitoring, and the monitoring is persistent or runs for an excessive amount of time (e.g., all threads of the WF have not completed within a predetermined time threshold or a number of computation cycles), a second WF is instead selected for monitoring to identify the streaming, normal, or reused status at blocks 405, 406, 407, respectively. In some embodiments, if another WF is selected, the particular counts are reset or reinitialized to facilitate an accurate determination of access type 405, 406, 407. In other embodiments, the counts are not reset and evaluation of WF behavior for the set of WFs is over the multiple evaluated (monitored) WFs.

Alternatively, according to other embodiments, the WF selected for evaluation, a profiler unit (not illustrated) in a CU operates to select one, two, three, or more WFs of the set of N-number of WFs to monitor for determining the access type for all WFs of the set of WFs 303. To facilitate and provide a low training time, i.e., providing a low ratio of monitoring time relative to total execution time at the GPU 100 for the set of WFs 303, monitoring of any WF can be terminated early when reaching certain conditions. For example, termination of monitoring occurs when execution finishes one loop iteration within instructions of the WF or when monitoring has collected enough cache access behavior to make a reasonably certain determination of the streaming, normal, or reused status at blocks 405, 406, 407, respectively. Reasonably certain can be a determination that has at least some statistically significant meaning for the respective count or measurement. In yet other embodiments, monitoring finishes when one or more of the LDT 104 and the MA 102 are filled with entries, or when the MA 102 has not experienced any MA eviction to the BF 103 for a certain predetermined time threshold amount of time.

According to some additional embodiments of the GPU 100, training continues throughout an application's execution (e.g., during execution of the set of N-number of WFs) using the same MA 102 and the LDT 104 per CU. This embodiment has the advantage of capturing changing behavior over time of vector loads. For example, further WF monitoring is performed on another WF after processing a predetermined number of WFs (e.g., 100 WFs, 200 WFs) of the set of WFs, or when processing a WF in excess of a certain percentage of the Nth WF of the set of WFs (e.g., monitor a next WF after the GPU 100 processing the 30%, 40%, 50% of the N-number of WFs in the set of WFs). Other embodiments use different Bloom filter variants that capture reuse and no-reuse with a lower false positive rate. For example, dual BFs are used in place of the BF 103, or a counting BF is used in place of the BF 103 in each CU 101, 105, 106, 107.

Further, given that applications generally show similar behaviors on all CUs, the per-CU tables (LTs) and bloom filters (BFs) can thus be optimized to be added onto only one or other certain number of CUs in the GPU 100, e.g., one per shader array or chiplet. To implement such embodiments, certain interconnects are provided to enable inter-CU communication where needed.

Whereas the monitoring itself is already lightweight given that it is only triggered once per kernel launch, it can be further optimized to amortize the expenses using the fact that one unique kernel, identified by a function name, is commonly launched multiple times. Instead of repeatedly monitoring per kernel launch, the GPU 100 keeps the trained data in the tables and structures and only flushes them if a different kernel is launched in the CU 101 or the GPU 100. In addition, the GPU saves (persists) and restores the training data from the tables and structures when the WFs of the kernel are preempted and re-launched.

Using the techniques and structures described above include fewer cache evictions, increased CU and GPU memory cache hit rates, and higher effective memory bandwidth. Cache capacity is effectively increased which translates into performance and energy improvements in the GPU 100. Compared to conventional compiler techniques to provide a same or similar behavior, the structures and techniques herein provide increased flexibility and portability of programming code and do not require compile time memory disambiguation of addressing and static prediction of streaming behavior.

Some conventional GPU cache management techniques focus on tracking reuse patterns per cache line. Such techniques require augmenting each cache line with metadata and adding extra tables at every cache where cache space within a GPU is at a premium in terms of wasted space and wasted energy. Moreover, such techniques scale poorly as a number of compute units (CUs) and a number of caches are increased. Where cache management is performed based upon a locality type, mistakes are easily introduced by identifying and designating a wrong locality type due to a lack of feedback from inter-instruction accesses. For instance, certain applications show streaming behavior for each instruction but commonly share data across instructions. In addition, locality behavior at the wavefront (WF) level, e.g., shorter reuse distance on inter-WF shared data, heavily depends on the application being executed by the GPU. Further, certain cache management techniques are limited to GPU private caches and require significant storage overhead and changes to cache structures that are impractical resulting in high GPU design complexity. The structures and techniques described above provide improvements over tracking reuse patterns on a per cache line basis.

In general, high performance and parallel processing systems such as the system 140 include one or more processors on one or more circuit boards. Such systems include one or more GPUs 100 combined with a central processing unit (CPU) 135. GPU as used herein refers to a processor providing parallel instruction execution including processors having single instruction, multiple thread (SIMT) and single instruction multiple data (SIMD) architectures. GPUs provide a set of GPU cores for executing instructions. GPU cores use parallel compute units to process multiple operations and request access to memory systems concurrently through multiple memory channels. In many applications, such as graphics processing, a sequence of work items is processed in order to generate a final result. Work items are also referred to as threads and work units. During processing, a processor core, also referred to as a "compute unit" (CU), is able to execute a thread with other CUs concurrently executing other threads, e.g., according to the single instruction, multiple data (SIMD) execution model.

Processing systems such as the system 140 cluster threads into groups of threads which are referred to as wavefronts (WFs) or warps that concurrently execute the same instruction on different data. Execution of a WF terminates when all threads within the WF complete their processing. Generally, the time required for each thread to complete processing depends on one or more criteria determined by data within the thread. As such, the threads within the WF can complete processing at different times. When the processing of all threads has been completed, a SIMD core finishes processing the WF and another WF is provided to the SIMD core.

For sake of consistency, as used herein, a WF is a collection of threads scheduled, or executed, or scheduled and executed as a batch in a parallel processing processor such as the GPU 100. Streaming as used herein refers to data that is loaded and used one time, used two times, or used a limited number of N times during execution of a set of WFs. Relatively high reuse refers to loads that are used two or more times including a finite number M times greater than N times. Reuse occurs among requests generated by a same vector load instruction, across vector load instructions of a same WF, across vector load instructions of a same workgroup (WG) or group, and across vector load instructions for a GPU kernel. Functions and applications executed on a GPU-based device are referred to as GPU kernels. The GPU kernel as used herein refers to one or more functions created by code and executed by one or more CUs of the GPU 100. A single device includes several compute units (CUs), which, in turn, include multiple processing elements (PEs) in each CU. A single GPU kernel execution can run on all or many of the PEs at one CU or across multiple CUs in the device in parallel. How a compute device is subdivided into CUs and PEs is generally vendor specific. A GPU driver provides an interface between the GPU and the operating system (OS) or hardware (e.g., CPU) of a device. An application programming interface (API) allows programs running on a device (e.g., CPU, OS) to launch GPU kernels and manage GPU memory, which is, according to certain embodiments, separate from host (CPU) memory and as designated as such above.

In some embodiments, the apparatus and techniques described above are implemented in a system including one or more integrated circuit (IC) devices (also referred to as integrated circuit packages or microchips), such as the GPU 100 described above with reference to FIGS. 1-4. Electronic design automation (EDA) and computer aided design (CAD) software tools may be used in the design and fabrication of these IC devices. These design tools typically are represented as one or more software programs. The one or more software programs include code executable by a computer system to manipulate the computer system to operate on code representative of circuitry of one or more IC devices so as to perform at least a portion of a process to design or adapt a manufacturing system to fabricate the circuitry. This code can include instructions, data, or a combination of instructions and data. The software instructions representing a design tool or fabrication tool typically are stored in a computer readable storage medium accessible to the computing system. Likewise, the code representative of one or more phases of the design or fabrication of an IC device may be stored in and accessed from the same computer readable storage medium or a different computer readable storage medium.

A computer readable storage medium may include any non-transitory storage medium, or combination of non-transitory storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, magnetic hard drive), volatile memory (e.g., random access memory (RAM), caches), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

In some embodiments, certain aspects of the techniques described above may implemented by one or more processors of a processing system executing software. The software includes one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method for managing wavefront loading in a processor, the method comprising:
    monitoring a selected wavefront of a set of wavefronts by:
        counting reuse of memory access requests for the selected wavefront; and
        calculating a cache hit rate of hits in one or more caches of the processor for instructions for the selected wavefront based on the counted reuse of the memory access requests; and
    based on the calculated cache hit rate, modifying one or more subsequent memory access requests for at least one cache of the one or more caches by associating with the one or more subsequent memory access requests to the at least one cache an indication of cache reuse based on an amount of cache reuse relative to a cache reuse threshold value.

2. The method of claim 1, wherein monitoring occurs once per wavefront kernel launch.

3. The method of claim 1, wherein monitoring includes monitoring load instructions of the selected wavefront across a same group of compute units of the processor and aggregating hits in the one or more caches of the same group for calculating the cache hit rate.

4. A method for managing wavefront loading in a processor, the method comprising:
    monitoring a selected wavefront of a set of wavefronts by:
        counting reuse of memory access requests for the selected wavefront, wherein counting reuse of the memory access requests includes:
            inserting a tag entry into a monitor array of a compute unit of the processor, the monitor array having tag entries for tracking memory access requests to the compute unit within the selected wavefront; and
            updating a count of reuses of data in a reuse field of an entry of a locality detection table, the locality detection table having a set of entries, each entry including the reuse field; and
        calculating a cache hit rate of hits in one or more caches of the processor for instructions for the selected wavefront based on the counted reuse of the memory access requests; and
    based on the calculated cache hit rate, modifying subsequent memory access requests of other wavefronts of the set of wavefronts by including an indication of cache reuse in subsequent memory access requests to at least one cache in the processor, wherein the indication of cache reuse is based on an amount of cache reuse relative to a cache reuse threshold value.

5. The method of claim 4, wherein the monitor array is direct-mapped to addresses of a cache of a group of compute units of the processor.

6. The method of claim 4, wherein each tag entry of the monitor array includes a part of a memory access request target address, and wherein the method further comprises:
    managing storage of data at the one or more caches based on the indication of cache reuse included in the subsequent memory access requests by:
        protecting a reused cache line by preventing cache line contents from being replaced by another cache line for a duration of processing the set of wavefronts; or
        bypassing a cache for streaming access requests for potential victim cache entries for the duration of processing the set of wavefronts.

7. The method of claim 4, wherein each entry of the locality detection table further includes a no-reuse field, the method further comprising:
    updating a count of no-reuses of data in the no-reuse field made by the wavefront memory access requests for data that are loaded in a cache and are not reused by the monitored wavefront.

8. The method of claim 4, wherein monitoring includes:
    inserting a tag entry of the monitor array into a tag entry in a Bloom filter coupled to the monitor array when the monitor array is full of entries and overflows, the Bloom filter having its own set of entries.

9. The method of claim 1, further comprising:
    based on the calculated cache hit rate, setting a reuse bit of subsequent memory access requests associated with the set of wavefronts, the reuse bit indicating high temporal locality with a relatively high amount of data reuse in one or more caches of a group of compute units of the processor.

10. The method of claim 9, wherein each compute unit of the group of compute units includes a coalescer, the method further comprising:
    consolidating the memory access requests by the coalescer, and wherein monitoring includes counting the reuse of memory access requests issued from the respective coalescers.

11. A processor comprising:
    a first memory cache; and a first compute unit of a group of parallel processing compute units, each compute unit including:
- a monitor array having tag entries for identifying memory access requests within a wavefront of a set of wavefronts loaded into the processor for execution; and
- a locality detection table having a set of entries corresponding to a respective program counter of the memory access requests within the wavefront, wherein each entry of the locality detection table includes:
  - a reuse field for a count of reuses of data made by the wavefront memory access requests; and
  - a status field associated with each of the wavefront memory access requests.

12. The processor of claim 11, wherein each entry of the locality detection table further includes a no-reuse field to count streaming vector loads in the processor.

13. The processor of claim 11, further comprising:
- the group of parallel processing compute units, including the first compute unit and a second compute unit for processing wavefronts of the set of wavefronts; and
- a second memory cache shared among the compute units of the group of parallel processing compute units.

14. The processor of claim 11, wherein each compute unit of the group of parallel processing compute units further includes a coalescer configured to consolidate memory access requests to the first memory cache.

15. The processor of claim 11, wherein the first compute unit further includes a Bloom filter coupled to the monitor array and having a set of tag entries, the Bloom filter configured to receive and store overflow entries evicted from the monitor array.

16. The processor of claim 11, further comprising:
- a memory controller having a scheduler, the scheduler providing the wavefronts of the set of wavefronts to the group of parallel processing compute units for execution by the processor as part of a parallel execution pipeline.

17. A processing system comprising:
- a central processing unit (CPU); and
- a group of parallel processing compute units coupled to the CPU and having memory caches, the CPU providing a kernel for the group of parallel processing compute units to execute, the group of parallel processing compute units comprising at least one compute unit that includes:
  - a monitor array having tag entries for identifying memory access requests within a wavefront of a set of wavefronts loaded into the group of parallel processing compute units for execution;
  - a locality detection table having a set of entries corresponding to a respective program counter of the memory access requests of the wavefront, wherein each entry of the locality detection table includes:
    - a reuse field for a count of a number of reuses of data made by the wavefront memory access requests; and
  - a coalescer configured to consolidate memory access requests to the memory caches.

18. The processing system of claim 17, wherein each entry of the locality detection table further includes a no-reuse field to count streaming vector loads of the wavefront of the set of wavefronts as the wavefront is processed by the group of parallel processing compute units in the processing system.

19. The processing system of claim 17, wherein the at least one compute unit further includes:
- a Bloom filter coupled to the monitor array, the Bloom filter having its own set of entries and being configured to receive an entry from the monitor array when the monitor array is full of entries and evicts an entry.

20. The processing system of claim 17, wherein each of the memory caches includes:
- an installation bypass module coupled to the locality detection table and configured to prevent a cache line of the memory cache from receiving data based on the set of entries of the locality detection table; or
- a replacement protection module coupled to the locality detection table and configured to protect cache lines of the memory cache from eviction based on the set of entries of the locality detection table; or
- both an installation bypass structure and a replacement protection module.

* * * * *